3,505,191
PRODUCTION OF CYCLOALIPHATIC KETOXIMES

Robert H. Williams, Pennington, and John P. Guarino, Trenton, N.J., assignors to Mobil Oil Corporation, a corporation of New York
No Drawing. Filed Apr. 15, 1966, Ser. No. 542,719
Int. Cl. C08f 1/16
U.S. Cl. 204—162                                    8 Claims

ABSTRACT OF THE DISCLOSURE

Ketoximes of cycloaliphatic hydrocarbons are formed by subjecting to ionizing (gamma) radiation a mixture of a $C_5$–$C_8$ cycloaliphatic hydrocarbon and a lower alkyl nitrite to form a nitrosoaliphatic compound. This is arranged to form the ketoxime.

---

This invention relates to the production of ketoximes of cycloaliphatic compounds in good yield by means of a radiation-induced chain reaction between a cycloaliphatic compound and an alkyl nitrite. It particularly relates to the production of cyclohexanone oxime, which is of value as an intermediate for making nylon. Thus, the oxime is convertible by the Beckmann rearrangement to caprolactam, and the latter by self-condensation yields nylon 6.

While cyclohexanone oxime has heretofore been made from cyclohexane by means of a radiation-induced reaction, the nitrosylating agent was simply nitric oxide, which formed nitrosocyclohexane in a non-chain reaction, and the latter by rearrangement formed the oxime. Because of the non-chain reaction, the yields of the nitroso compound and the oxime were quite low.

According to the invention, nitrosocyclohexane is also formed, but in a chain reaction, and rearranges to give the oxime. More particularly, and as applied to the production of cyclohexanone oxime, the invention comprises forming a mixture of cyclohexane and methyl nitrite in which the molar amount of the former exceeds that of the latter, adjusting the temperature and pressure of the mixture so that the reactants are in the liquid phase, irradiating the reactants with ionizing radiation, preferably gamma radiation, at a total dose of 0.001 to 100, preferably 0.01 to 10, megarads to form a substantial amount of the nitroso compound, then ceasing the irradiation, rearranging the latter compound to said oxime, and producing the oxime in a yield corresponding to a G value of at least about 50.

The invention contemplates the use of various cycloaliphatic compounds, particularly cycloalkanes having 5 to 8 carbon atoms in the ring portion and including cyclopentane, cyclohexane, cycloheptane, and cyclooctane. Other alkyl nitrites besides methyl nitrite include those wherein the alkyl group is ethyl, propyl, isopropyl, butyl, isobutyl, tertiary butyl, amyl, isoamyl, tertiary amyl, etc. These comprise a well-defined group of lower alkyl nitrites having 1 to 5 carbon atoms in the alkyl radical.

The mole ratio of the cycloaliphatic compound to the nitrite is preferably high, ranging from 10:1 to 90:1 or 100:1 or more, but it may also range as low as 2:1. Irradiation is preferably done at 5 to 50° C. at a pressure sufficient to maintain the reactants in the liquid phase. Somewhat higher and lower temperatures are also desirable, ranging from about 0 to about 80° C. Reaction times generally extend for no more than 1 to 4 hours but can be both longer and shorter. The method is suitable for batch or continuous operation, preferably the latter.

Gamma radiation is the preferred radiation. Suitably the energy level for the process is approximately 1 mev., although the level may range from 0.5 to 15 mev., and more broadly from 1 kev. to 20 or 30 mev. It will be understood that the invention is not dependent on the energy level, which may be as low as is effective and as high as desired. The total radiation dose is variable, but should be at least sufficient to produce a chemical conversion and, of course, not so high as to destroy the product. Illustrative total doses range from 0.001 to 100 megarads, and a preferred range is 0.01 to 10 megarads. A useful dose rate is about 0.1 megarad/hour, although this value may be increased or decreased as desired with corresponding changes in the time of irradiation. A typical range is 0.01 to 10, and a more general range is 0.001 to 100, megarads/hour.

Gamma radiation sources include radioactive materials like cobalt–60, praesodymium–144, cesium–137, sodium–24, manganese–56, gadolinium–72, cerium–144, lanthanum–140, etc., and also operating nuclear reactors. In addition, other ionizing radiation besides gamma is useful, including X-rays and fast neutrons, which like gamma radiation have good penetrating power. Less preferred are accelerated electrons, nuclear particles like protons, alpha and beta particles, deuterons, and fission fragments.

Gamma rays are a convenient and practical radiation, particularly in batch processes. Their penetrating power is such that only about 50%, more or less, is absorbed by an approximately 6-inch thick layer of reactants in the liquid phase; thus, if a tubular reactor is used as the irradiation vessel, its diameter may be at least 6 inches, and of course less, and the liquid reactants may be flowed therethrough in streams of coextensive cross section while being subjected to the radiation. As is thus apparent, use of gamma radiation favors use of larger reactors, and in turn of good flow rates, and the flowing reactant stream carries the product along therein. Furthermore, the reactor wall can be made strong enough to be pressure resistant without reducing the desired effectiveness of the radiation. Of further interest is the fact that gamma radiation does not produce radioactivity in the products or equipment.

Another suitable source of radiation is, as indicated, a nuclear reactor, particularly one which is also being used for electric power generation. A fraction of the energy produced by such a power reactor is available for use in radiation chemical processing. Thus about 7.5% of the energy is available initially as gamma radiation, and it has been estimated that up to 4.3% of the reactor power may be available as gamma radiation for chemical processing. Advantage may be taken of this available radiation by inserting a chemical process loop into the reactor core; the radiation reaching such loop comprises mainly neutrons and gamma rays, but not fission fragments as the loop can be shielded from them. The use of the mixed neutron and gamma field can thus take advantage of the large radiation potential of the reactor. Even more significant is the fact that the cost of the gamma component of this field is low; thus, for a radiation yield of product corresponding to a G value of only 1, the radiation power cost can be less than 1 or 2 cents per pound. For a G of 50, the cost would be less. This estimate neglects equipment costs, which in the case of a nuclear reactor used for power production may be justified. Costs of chemical processing equipment would not by comparison be expected to be substantial.

Another advantage of using the radiation from a nuclear reactor is that the reaction mixture has no appreciable radioactivity. Considering the reactants, the cycloaliphatic compound is a hydrocarbon, containing only carbon and hydrogen, while the alkyl nitrite also contains carbon and hydrogen, and in addition oxygen and nitrogen; and as is known, compounds of carbon, hydrogen, nitrogen, and oxygen are not appreciably activated by neutrons. Another advantage resides in the fact that it is possible to position the chemical reactor movably with respect to the core of the nuclear reactor and to control the radiation dose merely by changing the position of the chemical reactor relatively to the adjacent core.

Following the described irradiation step, the reaction mixture, assuming that cyclohexane and methyl nitrite are the reactants used, may be freed of gaseous material, comprising mainly hydrogen and methyl nitrite, by simply warming the mixture to room temperature or somewhat above, or if the reaction was carried out at or above room temperature, then by releasing the pressure. It will of course be advantageous to recover these materials, especially the methyl nitrite. Following such separation or recovery, it is preferred to convert the nitrosocyclohexane to the oxime, preferably by adding to the mixture a catalyst which influences the rearrangement, such as a conventional base or acid, or an alcohol like methanol, etc. As will be recognized, methanol is formed in the course of the reaction and can act as a catalyst, although the amount preferably is supplemented. Another suitable catalyst is a base like cyclohexyl amine dissolved in cyclohexane. The nitroso compound is present primarily in the form of its dimer, but in the described conversion, this is changed to the monomer and then to the oxime. When a strong acid like sulfuric or hydrochloric is used as the catalyst, it not only acts to rearrange, or isomerize, the nitroso compound to the oxime but also it acts to form an acid salt of the oxime. The acid salt is insoluble in the unchanged cyclohexane and can thus be separated therefrom. The oxime may be obtained by neutralizing the solution of the acid salt with a base, as a result of which step the oxime comes out as a solid or, if impurities are present, as an oil, which may then be purified; however, a preferred procedure is to neutralize the solution of the acid salt and then solvent extract this neutral solution to remove the oxime, after which the solvent is removed and the oxime recovered.

The oxime may be converted to caprolactam by means of the Beckmann rearrangement, comprising heating the same to about 100° C. in the presence of a strong acid such as 96% sulfuric acid, chlorosulfonic acid, or oleum. The resulting solution of caprolactam is neutralized, as with ammonia, and the crude lactam separates as the upper layer. It is drawn off and purified in several stages, including the use of vacuum distillation, into fiber grade caprolactam suitable for making nylon 6.

As illustrated by the following examples, yields of product are obtainable corresponding to a G (molecules of oxime product per 100 electron volts of radiation energy absorbed) of about 50 or more.

EXAMPLES 1 AND 2

Cyclohexane and methyl nitrite were reacted in several runs using a sealed glass tube as the reaction vessel. The tube was fitted with ground glass joints at both ends but with one end closed off by an internal break-off seal. The methyl nitrite was prepared by ester interchange with pentyl nitrite and further purified by removal of entrained methyl alcohol and possible traces of nitric oxide by distillation under appropriate temperature conditions using vacuum line techniques. To prevent photochemical decomposition, the purified methyl nitrite gas was stored in a bulb from which all light was excluded. The reactor tube was connected to the vacuum line and cyclohexane and methyl nitrite were distilled into it in the amounts noted in the table below. The reaction mixture was freed from air by several cycles of subjecting the reactants (cooled to $-196°$ C.) to the pumping action of the vacuum pumps (less than $5 \times 10^{-6}$ mm.). The tube was sealed off while at this temperature and pressure. On warming the reactants to about 5° C., a homogeneous liquid mixture was obtained. The reactor tube was then placed in a Dewar flask containing water which was maintained at the temperature noted in the table during the course of the irradiation. The samples were irradiated at a dose rate of about $1.3 \times 10^{19}$ ev./gm./hr. for 2 hours with gamma rays from 10 cobalt-60 pencils having a total strength of about 10 kilocuries.

After irradiation the tube was again connected to the vacuum line. The break-off seal was broken and the hydrogen (mainly) and unchanged methyl nitrite were removed by distillation from the product solution held at the appropriate temperature. The pressure of these gases was measured in bulbs of known volume. The liquid remaining in the tube was poured into a vial and analyzed directly by gas phase chromatography for cyclohexanone oxime. A small sample was diluted tenfold and analyzed by ultraviolet spectrophotometry for nitrosocyclohexane dimer. Although the presence of dimer was observed in all cases, it was found that the product was present in three forms: monomeric nitrosocyclohexane, dimeric nitrosocyclohexane, and the isomeric cyclohexanone oxime. The nitroso compounds gradually converted to the oxime, and yields were calculated on the basis of oxime. Pertinent data appear in the following table.

RADIATION SYNTHESIS OF NITROSOCYCLOHEXANE

| Experiment No. | 1 | 2 |
|---|---|---|
| Mole ratio, cyclohexane to methyl nitrite | 99:1 | 93:1 |
| Temperature, ° C. | 5 | 50 |
| Cyclohexane, g. | 3.864 | 3.836 |
| Methyl nitrite, g. | 0.028 | 0.030 |
| Total dose, e.v. $\times 10^{-20}$ | 1.09 | 1.08 |
| Oxime, micromoles | 88 | 104 |
| Oxime, moles/liter | $1.76 \times 10^{-2}$ | $2.08 \times 10^{-2}$ |
| G (oxime) | 49 | 58 |

The radiation dose in No. 1 corresponds to about 0.449 megarad.

While the invention is not to be limited by theoretical considerations, it may be of interest to indicate briefly the manner in which the synthesis of the oxime is believed to proceed. The radiation is considered to interact with cyclohexane to produce a cyclohexyl radical and a hydrogen atom; then the cyclohexyl radical is believed to react with methyl nitrite to form nitrosocyclohexane and a methoxy radical; the latter is then considered to react with another molecule of cyclohexane to form cyclohexyl radical and methanol, and in this third reaction the methoxy radical is considered to carry the chain, while the cyclohexyl radical is available for reaction with methyl nitrate to form another molecule of the nitroso compound. Equations for these reaction may be written as follows:

$$C_6H_{12} \rightarrow C_6H_{11}\cdot + H \quad (1)$$

$$C_6H_{11}\cdot + CH_3ONO \rightarrow C_6H_{11}NO + CH_3O \quad (2)$$

$$CH_3O\cdot + C_6H_{12} \rightarrow CH_3OH + C_6H_{11} \quad (3)$$

It will be evident from the foregoing that the radiation interacts with a single cyclohexane molecule to start a chain that results in many molecules of the nitroso product, from which it may be apparent that the cost of the radiation per unit weight of product may be quite small. As already described, the nitroso compound easily rearranges to the oxime, this reaction taking place in the reaction mixture with the passage of time, or as indicated, it may be accelerated by adding a catalyst to the mixture. It may be indicated as follows:

$$C_6H_{11}-NO \rightarrow C_6H_{10}=NOH \quad (4)$$

It may be recalled that in the irradiation of pure cyclohexane to produce cyclohexyl radicals, the G value for cyclohexyl radicals has been established as about 9.5. In the present case a G of at least 49 for cyclohexanone oxime was obtained, and since the formation of this product involved cyclohexyl free radicals, it is thus apparent that a chain reaction is present, particularly in view of the fact that a large excess of cyclohexane, in relation to methyl nitrite, is used.

It will be understood that the invention is capable of obvious variations without departing from its scope.

In the light of the foregoing description, the following is claimed:

1. Process of forming a ketoxime of a cycloaliphatic compound in good yield by means of a radiation-induced chain reaction between a cycloaliphatic compound having 5 to 8 carbon atoms in the ring portion thereof and an alkyl nitrite having 1 to 5 carbon atoms in the alkyl group comprising forming a mixture of said reactants in which the molar amount of the cycloaliphatic compound exceeds that of the alkyl nitrite, adjusting the temperature and pressure of said mixture so that the reactants are in the liquid phase, irradiating said reactants with ionizing radiation at a total dose ranging from 0.001 to 100 megarads to form a nitrosocycloaliphatic compound, rearranging the latter compound to said ketoxime, and forming the ketoxime in a yield corresponding to a G value of at least about 50.

2. Process of claim 1 wherein the cycloaliphatic compound is cyclohexane, the ketoxime is cyclohexanone oxime, and the alkyl nitrite is methyl nitrite.

3. Process of claim 1 wherein the temperature at which said reaction is carried out is in the range of 0 to 80° C.

4. Process of claim 1 wherein said ionizing radiation is gamma radiation.

5. Process of claim 1 wherein said ionizing radiation is radiation from a nuclear reactor, and wherein said reactants are shielded from fission fragments.

6. Process of claim 1 wherein said rearranging step is performed in the reaction mixture resulting from said irradiating step.

7. Process of claim 1 wherein said rearranging step is performed in the presence of an added catalyst for the step.

8. Process of forming a ketoxime of a cycloaliphatic compound in good yield by means of a radiation-induced chain reaction between a cycloaliphatic compound having 5 to 8 carbon atoms in the ring portion thereof and an alkyl nitrite having 1 to 5 carbon atoms in the alkyl group comprising irradiation a mixture of said reactants with ionizing radiation to form a nitrosocycloaliphatic compound, and subjecting the latter compound to rearrangement to form said ketoxime.

References Cited

UNITED STATES PATENTS 3,062,812 11/1962 Taylor _____ 204—162 X
3,141,839 7/1964 Metzger et al. _____ 204—162

HOWARD S. WILLIAMS, Primary Examiner

PO- 050
(5/69)

UNITED STATES PATENT OFFICE
CERTIFICATE OF CORRECTION

Patent No. 3,505,191          Dated April 7, 1970

Inventor(s) ROBERT H. WILLIAMS and JOHN P. GUARINO

It is certified that error appears in the above-identified patent and that said Letters Patent are hereby corrected as shown below:

Column 1, Line 16, "arranged" should be --rearranged--

Column 4, Line 49, "nitrate" should be --nitrite--

Column 4, Line 51, "reaction" should be --reactions--

Column 6, Line 17, "irradiation" should be --irradiating--

SIGNED AND
SEALED
AUG 18 1970

(SEAL)
Attest:

Edward M. Fletcher, Jr.
Attesting Officer

WILLIAM E. SCHUYLER, JR.
Commissioner of Patents